United States Patent [19]
Rutherford et al.

[11] Patent Number: 5,223,140
[45] Date of Patent: Jun. 29, 1993

[54] BIOLOGICAL TREATMENT OF COMBINED INK AND STARCH WASTEWATER FOR USE IN CORRUGATOR ADHESIVE PREPARATION

[75] Inventors: John H. Rutherford, Sheridan; Henry L. Peterson, Indianapolis, both of Ind.

[73] Assignee: Inland Container Corporation, Indianapolis, Ind.

[21] Appl. No.: 869,484

[22] Filed: Apr. 15, 1992

[51] Int. Cl.$^5$ .............................................. C02F 3/30
[52] U.S. Cl. ................................. 210/605; 210/606; 210/611; 210/614; 210/631
[58] Field of Search ............... 210/605, 614, 630, 631, 210/610, 611, 606, 631, 743

[56] References Cited

U.S. PATENT DOCUMENTS

| | | | |
|---|---|---|---|
| 3,926,795 | 12/1975 | Soldick | 210/605 |
| 4,124,501 | 11/1978 | Yen et al. | 210/605 |
| 4,257,897 | 3/1981 | Krichten et al. | 210/614 |
| 4,510,243 | 4/1985 | Haga et al. | 210/614 |
| 4,614,588 | 9/1986 | Li | 210/614 |
| 4,919,815 | 4/1990 | Copa et al. | 210/605 |

FOREIGN PATENT DOCUMENTS 58-199098 11/1983 Japan .

OTHER PUBLICATIONS

Keith E. Sickafoose, Ondutek International, Kendall Park, N.J., and W. David Stotler, Sprout Bauer, Inc., Muncy, Pa., "Flexo wash water feeds automatic starch preparation."

Stotler, "Preparing corrugating adhesive with untreated flexo wash water in an automated, high-shear mixer," Tappi Journal, pp. 140–142, Jul. (1991).

*Primary Examiner*—Stanley S. Silverman
*Assistant Examiner*—Christopher Upton
*Attorney, Agent, or Firm*—Fitch, Even, Tabin & Flannery

[57] ABSTRACT

The invention is process for biologically treating ink/starch waste-water which is typically produced from the process of making paper and cardboard products. Waste-water that contains naturally occurring facultative anaerobic bacteria is placed into a first tank so that the first tank and the mixture is stirred until a pH of between about 4 to about 6 is reached. The mixture is transferred into a second tank so that the second tank and aerobic bacteria is added to the mixture in the second tank, wherein the second tank has an aeration blower so as to make oxygen available to the aerobic bacteria. The mixture is held in the second tank until the mixture reaches aerobic equilibrium with a pH between about 7 and about 8. After reaching this equilibrium, the wastewater can be used in up to 100% makeup to prepare high quality corrugating adhesive of consistent parameters for viscosity and gelatinization temperature.

12 Claims, 1 Drawing Sheet

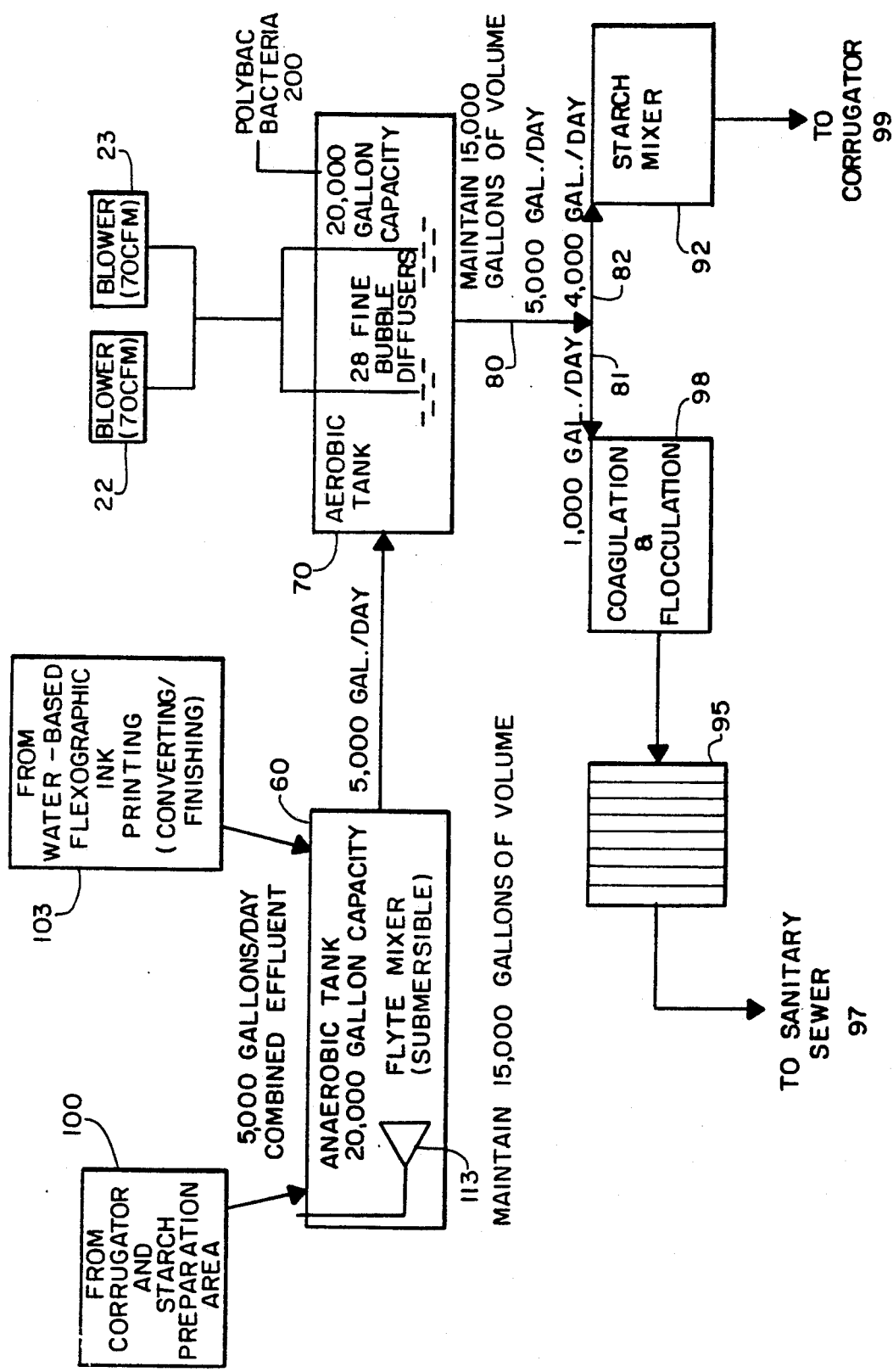

BIOLOGICAL TREATMENT OF COMBINED INK AND STARCH WASTEWATER FOR USE IN CORRUGATOR ADHESIVE PREPARATION

BACKGROUND OF THE INVENTION

In the production of paper and cardboard boxes, the process equipment is washed, thereby generating wastewater. This wastewater typically contains ink and cornstarch adhesive's and also has a high solids content. It is increasingly difficult, particularly under stricter environmental regulations at the federal, state and local levels, to dispose of this wastewater. Prior to the invention herein, attempts were made to use this biologically unstable or degradable ink and/or starch wastewater in making corrugating adhesives. Using the wastewater in making adhesive compositions was not very appealing, because the adhesive compositions are very sensitive to changes in water chemistry. It was found that when untreated wastewater was used, the pH of the water was not stable. Even when untreated wastewater was used in the secondary or uncooked portion of making the adhesive compositions, the fluctuations in the pH prohibited its use. In addition, very high BOD (biochemical oxygen demand) of the wastewater presented imposing problems in maintaining desirable adhesive properties in the resulting compositions. These inconsistencies were not only found from batch-to-batch, but even within a given batch over time.

Wastewater that had been treated through standard filter press technology was found to cause problems in its use in preparing adhesive compositions also. Even though the wastewater had been treated, it still had a very high BOD, which thereby required using higher levels of preservatives in the finished product. In an attempt to control the pH, caustic and alum were used to adjust the pH during the treatment process. This also adversely affected the water chemistry, thereby making the treated wastewater undesirable for use in preparing adhesive compositions.

Thus, biological treatment of wastewater to produce wastewater of consistent quality without the use of chemicals that affect final adhesive composition properties is, desirable. This biological treatment must produce a wastewater product that has a consistent pH, and alkalinity. The resulting product has a reduced solids content and a reduced BOD. By obtaining consistency in the pH, the alkalinity and the solids content of the wastewater, it will allow those in manufacturing to use even as much as 100% of the treated wastewater in preparing corrugating adhesive compositions. This is quite advantageous from a cost perspective and is environmentally desirable.

SUMMARY OF THE INVENTION

The process of treating this wastewater produces water that has stable pH/alkalinity and that has a lower biochemical oxygen demand. One of the benefits of treating this wastewater by the process herein is that the treated wastewater can be used in the preparation of adhesive compositions.

The process generally comprises transferring waste from manufacturing into a first tank that is ½ to ¾ full. The mixture is stirred until a pH of between about 4 to about 6 is reached. There are naturally occurring facultatively anaerobic bacteria in the wastewater. Typically, the facultatively anaerobic bacteria are selected from the groups consisting of *Pseudomonas, Bacillus* and *Enterobacteriaceae*. The bacteria degrade the organic wastes in the mixture, and one byproduct of this breakdown is acetic acid. Once the mixture is within the prescribed pH, the mixture is transferred to a second tank, which is equipped with aeration. Aerobic bacteria are added to the second tank, in particular Phenobac, which is a trademark of Polybac and can be purchased from Polybac Corporation, Courtney Place, 3894 Courtney St., Bethlehem, PA 18017, or an equivalent thereof. The aerobic bacteria could be selected from the group consisting of *Bacillus, Micrococcus, Pseudomonas, Saphyrophytes* and *Acinetobacteria*.

The second tank has an aeration blower so as to make oxygen available to the aerobic bacteria in the mixture. The bacteria in the, second tank utilize the acetic acid compound that was generated from the first tank. Once a pH of between about 7 and about 8 is reached the mixture may be transferred and used in the manufacture of adhesives. This treated wastewater, when used in the preparation of adhesives, aids in the manufacturing of an adhesive with consistent parameters for viscosity and gelatinization temperature. The mixture could, prior to use in the manufacture of adhesives, be transferred to a third holding tank and chemically to flocculate and settle solids.

DETAILED DESCRIPTION

The invention relates to a process for biologically treating ink/starch wastewater which is typically produced from the process of making paper and cardboard products, such as boxes. Once treated, the wastewater can be used to make adhesive compositions.

Water used for cleaning the machinery for manufacturing boxes contains excess ink pigments, trace metals, alcohols, such as methanol or isopropanol, dirt, oil and grease, paper fibers, starches and cellulosics. The treatment of this wastewater is a two-stage process.

The wastewater is accumulated into a first holding tank. Also contained within the mixture of wastewater are microorganisms that occur naturally in the environment. The microorganisms in this tank break down most of the organic matter, cellulosics, starches, etc. to acetic acid, and the like. When the microorganisms in the first tank hydrolyze the organics and solids, the resulting products are low molecular weight organic acids, such as acetic, propionic acid and the like. In hydrolyzing the organic matter, microorganisms release enzymes into the environment. These enzymes are produced naturally by the bacteria in the first tank, but to increase the efficiency of the first stage of the process, it might be desirable, although not necessary, to add the commercial enzymes. Enzymes may be added to the second tank if so desired. The commercial enzymes would increase the efficiency of the process by helping the bacteria breakdown the organic matter. Such enzymes could include diastases and ptyalin, which break starch down to maltose, or cellulase could be added to break cellulose down to cellobiose.

The first tank is typically about 12,000 gallons in size and is filled ½ to ¾ of the way full or the equivalent thereof. The sizes of the tanks may vary and be determined for any plant by the expected wastewater feed rate, the concentration at that particular plant and the retention time required to bring that amount of wastewater to a pH equilibrium. The bacteria in both stages of the process are mesophilic, and are most active within a temperature range of between about 80° to about 100° F. This temperature is generally maintained without the use of artificial heat, although it could be used.

The mixture in the first tank is continuously mixed to ensure that the solids and bacteria are in contact. This mixing provides an environment for enhanced degradation. The preferred mixer is a FLYTE mixer 4400 SR 3.2 HP, or the equivalent thereof, which can be purchased from Flygt Corporation at 129 Glover Avenue, Norwalk, CN 06856. The mixture is mixed at about 1000 to about 2500 RPMs, preferably at about 1,700 RPMs for about 8 hours. By mixing continuously, the contents of the solution are kept homogeneous and in contact with the facultatively anaerobic bacteria that are naturally occurring in the mixture.

The facultatively anaerobic bacteria can be selected from the group consisting of Pseudomonas, *Bacillus* and *Enterobacteria* and mixtures thereof. More specifically, *Pseudomonas maltoohilia, P. cepacia, P. putida, P. stutzeri. P. pseudomallei,* and *P. mallei* could be used. If *Bacillus* are used, the species *B. alevi, B. circulans, B. licheniformis, B. macerans, B. cereus, B. coaoulans. B. firmus. B. megaterium. B. polvmyxa,* and *B subtilis* are preferred. If *Enterobacteria* are used, then *Escherichia coli,* Enterobacter, Hafnia, and Serratia are preferred.

The solution in the first tank is held for as I5 long as possible, but is typically held for about 8 hours. If the digestion is allowed to continue too long, methane-forming bacteria, which are naturally occurring and are picked up in the wastewater, begin to break down the acids to form carbon dioxide and methane gas. The formation of these gases is undesirable because of the odor and generation of combustion in confined manufacturing areas. Once a pH of between about 4 to about 6 is reached, a portion of the mixture in the first tank is transferred to a second tank. If the pH drops below about 4, this would be an indication that the methane-producing bacteria were becoming very active in the mixture. This can be a continuous process, where more wastewater is added to the first tank. By adding more untreated wastewater to the first tank after a portion of its contents are transferred to a second tank, the potential for methane-forming bacteria becoming established is greatly reduced.

, Typically between about 33% to about 67% of the mixture in the first tank is transferred to a second holding tank. The second holding tank is maintained preferably at about two-thirds full. This tank is designed so that the contents are aerobically treated. The tank preferably contains one or more blowers to aerate the tank. The blowers typically operate between about 70 CFM to 20,000 CFM, and these blowers may be purchased at Purestream, Inc., P.O. Box 6115, Florence, KY 41042.

Initially the tank is seeded with a Polyaerobic bacteria called Phenobac ®, which can be purchased from Polybac Corporation, Courtney Place, 3894 Courtney St., Bethlehem, PA 18017, or an equivalent thereof. More specifically, a mixture of aerobic bacteria is a mixture of *Bacillus; Micrococcus,* such as *S. aures, S. epidermidis, S. saprohyticus,* and *S. haemolyticus, Pseudomonas; Saphyrophytes;* and *Acinetobacteria,* such as *A. anitratus,* and *A. lwoffi,* could be used. Any aerobic species of the above genuses could be used along with those species that are listed as factualatively anaerobic, since they will be aerobic in the presence of oxygen.

One seed should be sufficient for a tank that is about two-thirds full and is about 12,000 gallons in size. In the second tank, because the bacteria are aerobic, it is important to maintain aeration-blower operations constantly. The aerobic bacteria further digest the low molecular weight organics, such as acetic acids and other like compounds that were formed in the first tank and any other organic matter that was not digested in the first tank. A preferred embodiment of the process is adding additional nutrients, such as a fertilizer high in phosphorous, to the mixture in the second tank to ensure that the aerobic bacteria have nutrients available. One such fertilizer is 4-12-6. The mixture reaches an aerobic equilibrium when a pH between about 7 to about 8 is reached. By aerobic equilibrium is meant that the degradation is completed and further oxygen is not needed, and that the lack of oxygen is not a limitation in the process. This equilibrium is best attained after the retention time of at least about 4 to about 6 hours, more desirably about 8 hours for a tank that is two-thirds full and is about 12,000 gallons, or the equivalent thereof. The treated wastewater from this second holding tank can be effectively used as needed. The fluctuations in the pH, if the wastewater were not treated and used in the manufacturing of adhesive compositions, were observed. However, by practicing the invention herein, such fluctuations were not seen. It is thought that by treating the wastewater there might be some interaction with the bacteria and the organics so that a buffering effect occurs. The wastewater solids prior to treatment is usually typically between about 10,000 ppm to about 100,000 ppm, more typically between about 20,000 ppm to about 80,000 ppm. However, after treatment of the waste-water, the solids content is usually between about 10,000 to about 50,000 ppm, or about 1 to about 8 percent of the resulting composition. Preferably, the treated wastewater, after the second stage of the process, has a solids content of about 1 to about 5 percent. In situations where more wastewater is generated than can be consumed, then a third tank, a holding tank, can be used where typically the gallon capacity is about 6,000 gallons. The wastewater in the third tank can be further treated using chemical treatments to flocculate and settle any additional solids from the wastewater. Such processes could include Alar, decanting and slurry screening under pressure by use of a filter pressing system. Further chemical treatments could be used and are well known in the field of water treatment. After chemical treatment and settling of solids, the slurry could be flocculated and passed through a filter press or the like. The chemical treatments are not necessary, but can be any of those typically used in routine sludge-making procedures.

FIG. 1 is a schematic of a continuous process of one of the embodiments of the invention. From the corrugator and the starch preparation process 100 and the water base ink printing 103 waste is combined and this combined effluent is transferred to a first tank 60. The effluent contains naturally occurring facultatively anaerobic bacteria. The effluent transferred to the tank is about 5000 gallons per day. The first tank has a 20,000 gallon capacity with submersible mixer 113. This submersible mixer is the preferred means of agitation of the mixture. The mixture in the first tank is slowly mixed for 8 hours, at 1,700 RPMs. The mixture, about 5,000 gallons, is transferred to a second tank 70 that is equipped with two blowes 22, 23 for aeration of the mixture.

The second tank 70 has a 20,000 gallon capacity, and about 15,000 gallons of the volume is maintained per day. In the second tank, about, 3 to about 5 lbs. of aerobic bacteria, Phenobac ®, is added every other day for about two weeks, until the colony is firmly established. The tank is inoculated again if the initial colony's food supply is temporarily interrupted, causing some of the colonies to die. In addition to adding the aerobic bacteria, 5 lb. of fertilizer containing phosphorous is added every other day for a week. If the tank contains over 5,000 gallons, preferably it does not contain more than 15,000 gallons, then about 5 to about 7 lbs. of aerobic bacteria is added to the tank along with 5 lbs. of fertilizer high in phosphorous. The fertilizer is added every other day for two weeks.

About 5,000 gallons of the mixture 80 from the second tank 70 are removed daily. A portion of this, 1000 gallons 81, is transferred to a flocculation tank 98, and about 4,000 gallons 82 is transferred to the starch mixer 92 for the use in preparing corrugator adhesive compositions 99. The mixture in the flocculation tank 98 can be further treated chemically, and the solids are allowed to settle prior to running this mixture through a filter press 95 and discharging the filtrate into the sewer 97.

EXAMPLES

Example 1 the wastewater treatment system is operated on a continuous basis such that approximately 5000 gallons per day of combined effluent from the corrugator/starch preparation area and the converting/finishing area is fed to Tank A to maintain a volume of approximately 15,000 gallons of effluent in Tank A. Tank A, which is a 20,000 gallon capacity, bullet-shaped tank, is mixed continuously with a Flygt 1-horsepower submersible mixer to ensure a thorough blend of wastewater solids and bacteria.

Tank A contains naturally occurring facultatively anaerobic bacteria which degrade components in the effluent to low molecular weight organic acids, such as acetic acid. Anaerobic colonies are established after approximately two to three days. The pH, temperature and flow rates of Tank A are monitored to determine when conditions have been optimized.

The pH of Tank A is monitored until the pH drops to approximately $5.0 \pm 1.0$ which requires approximately 4 to 6 hours after the addition of wastewater. After the pH of Tank A reaches approximately $5.0 \pm 1.0$, about 5000 gallons of effluent from Tank A is transferred to Tank B. Tank B is a 20,000 gallon bullet tank which is maintained at a volume of about 15,000 gallons. Two Purestream 70 CFM Air Blowers provide continuous aeration through 28 fine bubble diffusers within the tank.

Microbial colonies are established in Tank B by adding approximately five pounds of Phenobac ® (a freeze-dried inoculum produced by Polybac Corporation), or its equivalent, every other day for approximately the first two weeks of continuous operation. In addition, five to seven pounds of fertilizer (4-12-6) is added along with the inoculum. The optimal temperature range for microbial activity is 80° to 100° F.

The pH of Tank B is monitored until the effluent reaches a stabilized pH of about 7.0 to 7.5, which requires approximately 4 to 6 hours after addition of Tank A effluent to Tank B. After Tank B reaches a stabilized pH of about 7.0 to 7.5, 4000 gallons of effluent from Tank B are transferred for use as makeup water in corrugator adhesive preparation. An additional 1000 gallons of effluent from Tank B are transferred to a separate chemical treatment tank for flocculation and settling of solids prior to running through a filter press and discharge of filtrate to the sewer.

Example 2

The wastewater treatment system is operated on a continuous basis such that approximately 3000 gallons per day of combined effluent from the corrugator/starch preparation area and the converting/finishing area is fed to Tank 1 to maintain a volume of approximately 5,000 gallons of effluent in Tank 1. Tank 1, which is a round, 7,000 gallon capacity tank, about 8 ft. in diameter × 20 ft. in height, is mixed continuously with a Lightnin' 3-horsepower vertically mounted mixer to ensure a thorough blend of wastewater solids and bacteria.

Tank 1 contains naturally occurring facultatively anaerobic bacteria which degrade components in the effluent to low molecular weight organic acids, such as acetic acid. Anaerobic colonies are established after approximately two to three days. The pH, temperature and flow rates of Tank 1 are monitored to determine when conditions have been optimized.

The pH of Tank 1 is monitored until the pH drops to approximately $5.0 \pm 1.0$, which requires approximately 4 to 6 hours after addition of wastewater. After the pH of Tank 1 reaches approximately $5.0 \pm 1.0$, about 3,000 gallons of effluent from Tank 1 is transferred to Tank 2. Tank 2 is a round, 7,000 gallon holding tank which is about 8 feet in diameter and 20 feet tall. Two Purestream 70 CFM Air Blowers provide continuous aeration through a series of bubble diffusers within the tank. The blowers are timed to run alternately, as one blower is usually adequate for aeration.

Microbial colonies are established in Tank 2 by adding three to five pounds of Phenobac (a freeze-dried inoculum produced by Polybac Corporation), or its equivalent, every other day for approximately the first week of continuous operation. In addition, five pounds of fertilizer (4-12-6) are added along with the inoculum. The optimal temperature for microbial activity is 80° to 100° F. This temperature is maintained without artificial heating, however the tank may be insulated to prevent heat loss.

The pH of Tank 2 is monitored until the effluent reaches a stabilized pH of about 7.0 to 7.5, which requires approximately 4 to 6 hours after addition of Tank 1 effluent to Tank 2. After Tank 2 reaches a stabilized pH of about 7.0 to 7.5, 2,500 to 3,000 gallons of effluent from Tank 2 are transferred for use as makeup water in corrugator adhesive preparation. Any extra amount of water is pumped to a chemical treatment tank for flocculation and settling of solids prior to running through a filter press. The filtered water is then used for plant wash-up.

What is claimed is:
1. A process of treating wastewater comprising:
   a) placing a wastewater mixture the contains starch and a naturally occurring faculative anaerobic bacteria in a first tank so that the first tank is between ¼ to ⅞ full and stirring the mixture until the pH of the mixture drops to between about 4 to about 6;
   b) transferring at least a portion of the mixture into a second tank so that the second tank is between about ¼ to about ⅞ full and adding aerobic bacteria to the mixture in the second tank, wherein the second tank has an aeration blower so as to make oxygen available to the aerobic bacteria in the mixture and the mixture is held in the second tank until the mixture reaches aerobic equilibrium with a pH between about 7 and about 8.

2. The process of claim 1 wherein the anaerobic bacteria is selected from the group consisting of *Pseudomonas, Bacillus* and *Enterobacteria.*

3. The process of claim 1 wherein the mixture in the first tank is stirred under agitation of between about 1,000 to about 2,500 rpms.

4. The process of claim 1 wherein the second holding tank is seeded with a polyaerobic bacteria selected from the group consisting essentially of *Bacillus, Micrococcus, Pseudomonas, Saphyrophytes* and *Acinetobacteria.*

5. The process of claim 1, wherein a portion of the mixture is transferred to a corrugating adhesive process, and a portion is transferred to a third tank.

6. The process of claim 1, wherein after the wastewater of the second tank reaches aerobic equilibrium, the mixture is transferred to a third holding tank and chemically treated to flocculate nd settle solids.

7. The process of claim 1, wherein the solids content in the second tank, after reaching aerobic equilibrium, is between about 10,000 to about 50,000 ppm.

8. The process in claim 1, wherein the solids content is the second tank, after reaching aerobic equilibrium, is between about 1 to about 8 percent of the mixture.

9. The process of claim 1, wherein enzymes are added to the second tank.

10. The process in claim 1, wherein fertilizer is added to the mixture in the second tank.

11. The process in claim 1, wherein enzymes are added to the first tank.

12. The process of claim 1, wherein the first tank contains a submersible mixer.

* * * * *